(12) United States Patent   (10) Patent No.: US 6,477,561 B1
Robsman   (45) Date of Patent: Nov. 5, 2002

(54) THREAD OPTIMIZATION

(75) Inventor: Dmitry Robsman, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/096,723

(22) Filed: Jun. 11, 1998

(51) Int. Cl.[7] .............................................. G06F 9/00
(52) U.S. Cl. ...................... 709/105; 709/102; 709/103; 709/107
(58) Field of Search ................................ 709/100, 101, 709/102, 104, 106, 108, 310, 103, 105, 107

(56) References Cited

U.S. PATENT DOCUMENTS 5,752,031 A * 5/1998 Cutler et al. ............... 709/103
6,105,053 A * 8/2000 Kimmel et al. ............. 709/105
6,161,166 A * 12/2000 Doing et al. ............... 711/125

* cited by examiner

Primary Examiner—Majid Banankhah
(74) Attorney, Agent, or Firm—Lee & Hayes, PLLC

(57) ABSTRACT

An application program executes on a computer capable of executing multiple execution threads. The threads produce varying processor loads. The application program assigns task requests to the execution threads and keeps track of how many of the threads have become active. The application program also maintains a variable limit on the number of active execution threads. Each execution thread calls a gating function before performing its assigned task request, and also calls an exit function after performing the assigned task request. The gating and exit functions maintain a current count of active execution threads. Furthermore, the gating function potentially changes the variable limit depending on the current processor load of the computer. In addition, the gating function temporarily delays execution of its execution thread depending on a comparison of the number of active execution threads to the variable limit.

42 Claims, 3 Drawing Sheets

THREAD OPTIMIZATION

TECHNICAL FIELD

This invention relates to application programs that use and manage multiple execution threads.

BACKGROUND OF THE INVENTION

A typical server application has a pool of execution threads, referred to herein as worker threads, for performing requested tasks. The task requests arrive asynchronously at a thread pool manager. The thread pool manager queues the requests for available worker threads. When a worker thread becomes available, the pool manager removes a request from the queue and assigns it to the available worker thread. The worker thread performs the requested task and then become available for another task request.

When designing a server application program such as this, it becomes necessary to set a limit on the total number of threads that will be made available from the thread pool. The optimum limit depends on the type of work being performed by the processors executing the threads. I/O-related tasks are relatively non-intensive in terms of processor utilization because of the frequent waits imposed by peripheral devices. If these types of tasks are being performed, it is most efficient to allocate a large number of worker threads to fully utilize the available processing bandwidth of the processors. Computational tasks, on the other hand, result in a relatively high utilization of a computer's processors. If these types of tasks are being performed, it is more efficient to limit the number of worker threads to the number of available processors. Otherwise, processing time is wasted by frequent switching between threads.

Any decision regarding the optimum thread pool size is complicated when processor scalability is considered. With multiple processors, lock contention can become a serious problem. Furthermore, lock contention problems are exacerbated with larger numbers of threads. In certain situations, the use of a large number of threads can actually produce negative processor scalability: performance decreases with the addition of processors because of many worker threads trying to obtain the same locks.

It is very difficult to optimize the thread pool for a particular application program, mainly because of constantly changing conditions. Specifically, the type of work performed by a computer's processors changes with time. Even if the needs of the application program were known, an optimization might become ineffective due to activities of different application programs and/or processes. Furthermore, the same requests might generate different types of blocking behavior at different times, depending on conditions independent of the application program itself.

Another potential problem is that a server program might not even have direct control over a thread pool, such as when the thread pool is provided by a separate application or external function library.

SUMMARY OF THE INVENTION

The inventor has solved the problem of thread pool optimization by varying the number of available threads over time. A thread limit is maintained and repeatedly updated based on the actual CPU utilization of the computer. If CPU utilization is low, the thread limit is set at a relatively high number. If CPU utilization is high, the thread limit is set to a relatively low number.

When a thread is initiated to service a request, the thread calls a gating function first. The gating function compares the current number of active threads against the current thread limit. If the thread limit has been equaled or exceeded, the gating function delays its calling thread for a predefined time and then checks again. The thread is allowed to continue only after the number of active threads has dropped below the thread limit.

In addition to the gating function, the thread calls an exit function after it has completed servicing the current request, just before the thread is ready to process the next request. The gating function and the exit function maintain the count of active threads. The gating function increments an active thread count variable just before returning control to its calling thread. The exit function decrements the active thread count variable just before the thread is returned to the thread pool.

The thread limit is updated at a predefined interval such as one second. An update function calls an existing operating system function to determine current CPU utilization. If the CPU utilization is below a defined lower threshold, the thread limit is increased. If the CPU utilization is above a defined upper threshold, the thread limit is decreased.

DETAILED DESCRIPTION

Figure 1:
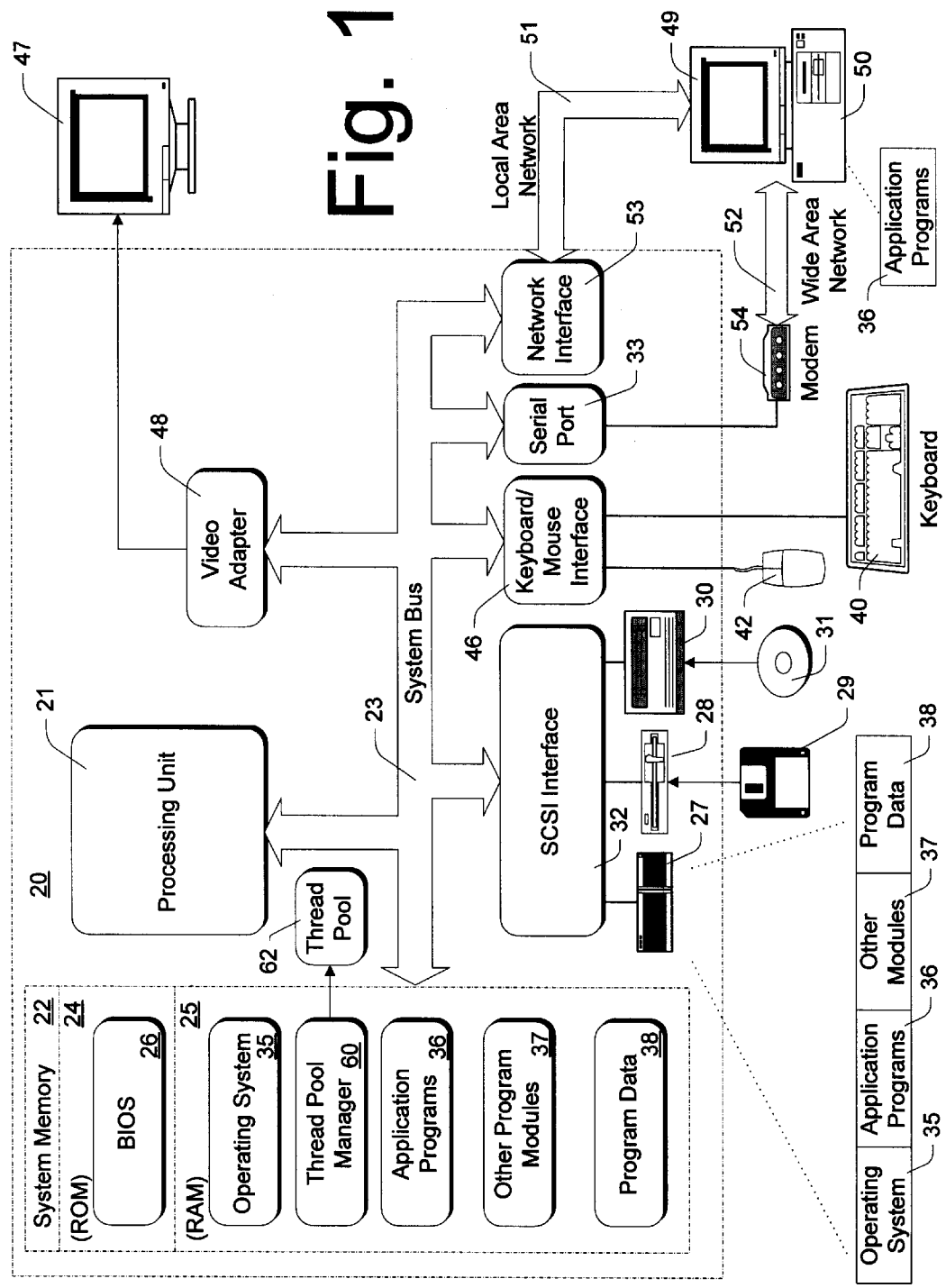
FIG. 1 is a block diagram of a computer system in accordance with the invention.

FIG. 1 and the following discussion are intended to provide a brief, general description of a suitable computing environment in which the invention may be implemented. Although not required, the invention will be described in the general context of computer-executable instructions, such as program modules, being executed by a conventional personal computer that is configured in a network environment as a server. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. In a distributed computer environment, program modules may be located in both local and remote memory storage devices.

With reference to FIG. 1, an exemplary system for implementing the invention includes a general purpose computing device in the form of a server computer 20, including one or more processors or processing units 21, a system memory 22, and a system bus 23 that couples various system components including the system memory to processors 21.

The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within server computer 20, such as during start-up, is stored in ROM 24. The server computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by an SCSI interface 32 or some other appropriate interface. The drives and their associated computer-readable media provide nonvolatile storage of computer readable instructions, data structures, program modules and other data for the server computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 29 optical disk 31, ROM 24, or RAM 25, including an operating system 35, one or more application programs 36, other program modules 37, and program data 38. A user may enter commands and information into the server computer 20 through input devices such as keyboard 40 and pointing device 42. Other input devices (not shown) may include a microphone, joystick, game pad, satellite dish, scanner, or the like. These and other input devices are connected to the processing unit 21 through an interface 46 that is coupled to the system bus. A monitor 47 or other type of display device is also connected to the system bus 23 via an interface, such as a video adapter 48. In addition to the monitor, personal computers typically include other peripheral output devices (not shown) such as speakers and printers.

The server computer 20 operates in a networked environment using logical connections to one or more remote client computers, such as a client computer 49. The client computer 49 may be another personal computer, a server, a router, a network PC, a peer device or other common network node, and typically includes many or all of the elements described above relative to the personal computer 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise-wide computer networks, intranets, and the Internet.

When used in a LAN networking environment, the server computer 20 is connected to the local network 51 through a network interface or adapter 53. When used in a WAN networking environment, the server 20 typically includes a modem 54 or other means for establishing communications over the wide area network 52, such as the Internet. The modem 54, which may be internal or external, is connected to the system bus 23 via a serial port interface 33. In a networked environment, program modules depicted relative to the personal computer 20, or portions thereof, may be stored in the remote memory storage device. It will be appreciated that the network connections shown are exemplary and other means of establishing a communications link between the computers may be used.

Generally, the data processors of computer 20 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described.

The computer, in conjunction with its processors and operating system, is capable of executing multiple execution threads that produce time-varying processor loads. In the embodiment described herein, server computer 20 runs under the Windows NT operating system. There are publicly available API's, for use in conjunction with the Windows NT operating system, that have functions allowing an application program to determine the current processor utilization of the computer. One such API is referred to as the NTDLL.DLL API, and is available through Microsoft's Developer Network (MSDN). The particular function utilized in the described embodiment of the invention is named "NtQuerySystemInformation". It returns values that can be used to calculate the current CPU utilization as a percentage, from 0% to 100%. This function will be referred to herein as a processor utilization function.

For purposes of illustration, programs and other executable program components such as the operating system are illustrated herein as discrete blocks, although it is recognized that such programs and components reside at various times in different storage components of the computer, and are executed by the data processor(s) of the computer.

In accordance with the invention, application programs 36 include a server application program that provides services to various requesting remote clients. The server application program includes a thread pool manager, which is represented separately in FIG. 1, labeled with reference numeral 60. The thread pool manages a thread pool 62 containing a plurality of threads. Each thread is executed by the processors of computer 20. The thread pool receives service or task requests from other program modules and entities. It responds to the requests by assigning them to respective threads. The threads perform their task requests and are then returned to thread pool 62. Although the thread pool is illustrated as a discrete entity, it represents resources that are provided by both processing unit 21 and memory 22.

In order to implement the invention, it is not necessary to modify the thread pool manager or its allocation logic. As will be described below, two function calls are inserted in the threads themselves to regulate the number of threads that are active at any given time. Such regulation is referred to as "gating." A first function call, referred to as a "gating" function, is inserted in a thread prior to the code that performs the request execution assigned to the thread. A second function call, referred to as an "exit" function, is inserted in the thread subsequent to the code that performs the request execution assigned to the thread.

Together, the two functions implement the gating functions of the invention. The functions keep a current count of the number of "active" execution threads. The term "active" is used herein to indicate a thread that has been initiated with an assigned task request and that has been allowed to continue by the gating function. The functions also maintain a variable limit on the number of active execution threads. Before allowing a thread to continue, the gating function compares the number of active threads to a variable limit. If the limit has already been met, the thread is temporarily delayed (the thread is not allowed to become active). Otherwise, the gating function ends, and the thread continues with its assigned task request (thereby becoming active).

Each time it is called, but no more than once a second, the gating function adjusts the variable limit. Any adjustment depends on the current processor load of the computer. If the processor load is low, the variable limit is increased to allow more threads to execute. If the processor load is high, the variable limit is decreased to allow fewer threads to become active.

Figure 2:
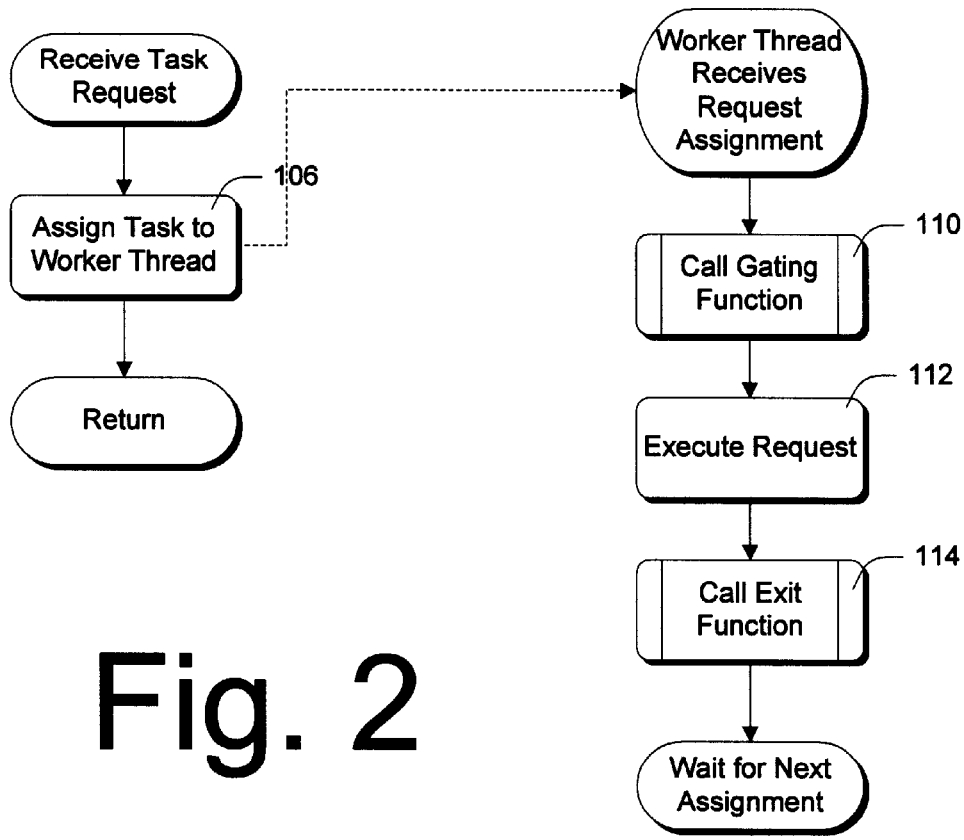
FIG. 2 is a flowchart showing preferred steps performed by a thread pool manager and by a thread.

FIG. 2 shows steps performed by the thread pool manager in response to a task request. A step 106 comprises assigning the requested task to a worker thread. The thread is initiated and begins execution. A dashed line indicates initiation of the worker thread, which is shown at the right-hand side of FIG. 2.

The worker thread first performs a step 110 of calling the gating function. Upon return from the gating function, the thread performs its assigned task request, as indicated by block 112. After performing its assigned task request, the thread performs step 114, which comprises calling the exit function. The thread is then returned to the thread pool.

Figure 3:
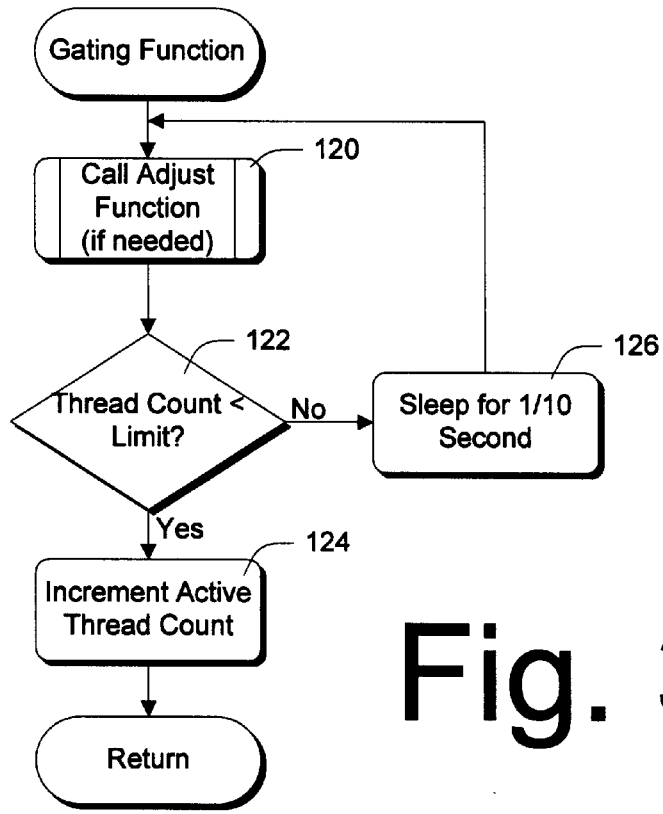
FIG. 3 is a flowchart showing preferred steps performed by a gating function.

FIG. 3 illustrates the steps performed by the gating function. A step 120 comprises calling an "adjust" function, which maintains the variable limit of active execution threads. This function is called only if a predefined time interval has passed since the last time the function was called. In the described embodiment, the predefined time interval is equal to one second.

A comparison 122 is then performed, comparing the number of currently active threads (the thread count) to the variable limit. The gating function temporarily delays execution of its execution thread depending on the result of decision step 122. If the number of active threads is less than the limit, step 124 is performed of incrementing a thread count variable representing the current number of active threads. The gating function then terminates and returns, allowing the thread to continue its execution. If the result of step 122 is false, and the number of active threads is already greater than or equal to the variable limit, a step 126 is performed of temporarily delaying the thread for a predetermined time such as one tenth of a second. Steps 120 and 122 are then repeated. Thus, delaying step 126 is repeated until the result of step 122 becomes true: the thread is allowed to continue (and thereby become "active") only after the number of active threads decreases below the variable limit. Alternatively, the variable limit might eventually be increased enough to change the result of step 122. This effectively delays any new threads until the computer's processors are able to efficiently performs the threads' tasks.

Although FIG. 3 does not indicate any limit on the amount of accumulated time that a thread might be delayed, in actual practice it is desirable to limit the delay time that might be caused by multiple iterations of step 126. For example, it might be desired to limit the cumulative delay to 5 seconds—if a thread has already been delayed by five seconds, it will be activated regardless of the outcome of step 122. This avoids situations where a thread might be delayed for an unreasonable amount of time.

Figure 4:
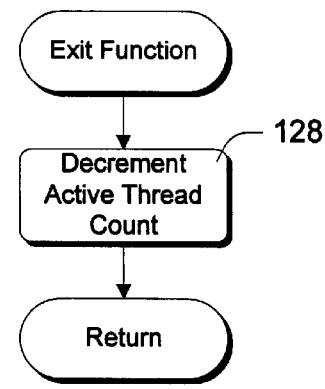
FIG. 4 is a flowchart showing preferred steps performed by an exit function.

FIG. 4 illustrates the steps performed by the exit function. This function performs a single step 128 of decrementing the thread count variable mentioned above.

Figure 5:
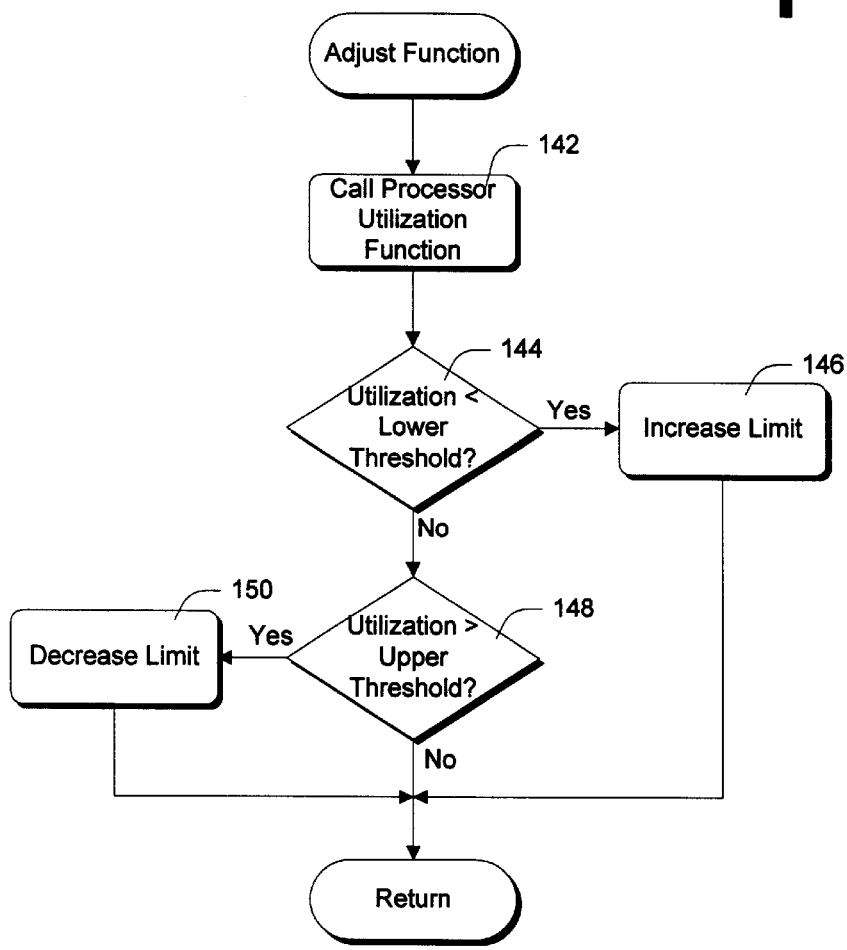
FIG. 5 is a flowchart showing preferred steps performed by an adjust function.

FIG. 5 shows the steps of the adjust function, which is called by the gating function to periodically adjust the variable limit on the number of active threads. In practice, the adjust function is called only after predefined intervals. In the embodiment described, the adjust function adjusts the variable at a frequency which is no greater than once every one second.

A first step 142 comprises determining the current processor or CPU utilization. This is accomplished in the described embodiment by calling the processor utilization function noted above. The utilization is returned as a percentage of full utilization, indicating processor load for the previous second in time.

Step 144 comprises comparing the processor utilization against a lower threshold. If the utilization is lower than the lower threshold, the variable limit is increased in a step 146, whereupon the function terminates and returns. Otherwise, a step 148 is performed of comparing the processor utilization against an upper threshold. If the utilization is greater than the upper threshold, the variable limit is decreased in step 150, whereupon the function terminates and returns. If the utilization is between the lower threshold and the upper threshold, the function returns without modifying the variable limit. The lower and upper threshold are set to 75% and 90% in the described embodiment of the invention.

In one embodiment of the invention, the variable limit is simply incremented or decremented by a value of one during each iteration of steps 146 and 150. In other embodiments, the variable limit might be adjusted by other amounts. Furthermore, it is preferable to adjust the limit by increasing amounts if the processor utilization remains outside the lower and upper thresholds for subsequent iterations of steps 146 and 150. This reduces the time needed to optimize the number of active threads.

Additionally, the variable limit is not allowed to decrease below the number of processors in computer 20. The maximum value of the variable limit is equal to the maximum number of threads available from the thread pool manager.

The invention allows an application program to optimize processor utilization in spite of varying conditions, many of which are outside the control of the application program. Without any significant changes to the thread pool manager or to thread allocation logic, the application activates no more than an allowed number of a thread pool's available execution threads, and repeatedly changes the allowed number of threads based on the current processor load of the computer.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method of managing execution threads on a computer having varying processor loads, comprising the following steps:

assigning task requests to a plurality of available execution threads;

activating no more execution threads than an allowed number limit of the available execution threads;

repeatedly changing the allowed number limit during execution of the execution threads depending on the current processor load of the computer.

2. A method as recited in claim 1, wherein the computer has a known number of processors, and wherein the allowed number limit is always as great as the known number of processors.

3. A method as recited in claim 1, wherein the step of repeatedly changing the allowed number limit is performed only at predefined minimum intervals.

4. A method as recited in claim 1, wherein the step of repeatedly changing the allowed number limit comprises:
- lowering the allowed number limit if the current processor load is over a first threshold;
- raising the allowed number limit if the current processor load is under a second threshold.

5. A method as recited in claim 1, wherein the step of repeatedly changing the allowed number limit is performed by a gating function that is called from within the execution threads upon initiation of the execution threads.

6. A method as recited in claim 1, wherein the step of repeatedly changing the allowed number limit is performed by a gating function that is called from within the execution threads upon initiation of the execution threads, wherein the gating function limits the number of active execution threads by delaying its own execution thread.

7. A computer-readable storage medium containing instructions for execution on a computer capable of executing multiple execution threads, wherein the CPU operates under varying processor loads, the instructions performing steps comprising:
- maintaining a variable limit on the number of active execution threads;
- repeatedly changing the variable limit during execution of the instructions, depending on the current processor load of the computer;
- assigning task requests to the execution threads;
- within each execution thread, calling a gating function before performing an assigned task request, wherein the gating function temporarily delays execution of its execution thread depending on a comparison between the number of active execution threads and the variable limit.

8. A computer-readable storage medium as recited in claim 7, wherein the computer has a known number of processors, and wherein the variable limit is always as great as the known number of processors.

9. A computer-readable storage medium as recited in claim 7, wherein the gating function is configured to delay execution of its execution thread for no more than a predefined time.

10. A computer-readable storage medium as recited in claim 7, wherein the gating function repeatedly compares the number of active execution threads to the variable limit to determine whether to continue to delay execution of its execution thread.

11. A computer-readable storage medium as recited in claim 7, wherein:
- the gating function repeatedly compares the number of active execution threads to the variable limit to determine whether to continue to delay execution of its execution thread;
- the gating function is configured to delay execution of its execution thread for no more than a predefined time.

12. A computer-readable storage medium as recited in claim 7, wherein:
- a thread count variable indicates the number of active threads;
- the gating function increments the thread count variable;
- each execution thread calls an exit function after performing an assigned task request, wherein the exit function decrements the thread count variable.

13. A computer-readable storage medium as recited in claim 7, wherein the gating function changes the variable limit only after predefined intervals.

14. A computer-readable storage medium as recited in claim 7, wherein the gating function changes the variable limit by increasing amounts after predefined intervals.

15. A computer-readable storage medium as recited in claim 7, wherein the gating function lowers the variable limit if current processor load is over a first threshold; and wherein the gating function raises the variable limit if the current processor load is under a second threshold.

16. An application program that executes on a computer capable of executing multiple execution threads that produce varying processor loads, the application program being configured to perform steps comprising:
- maintaining a variable limit on the number of active execution threads;
- assigning task requests to the execution threads;
- within each execution thread, calling a gating function before performing an assigned task request;
- within each execution thread, calling an exit function after performing the assigned task request;
- wherein the gating and exit functions maintain a current count of active execution threads;
- wherein the gating function potentially changes the variable limit depending on the current processor load of the computer;
- wherein the gating function temporarily delays execution of its execution thread depending on a comparison of the current count of active execution threads to the variable limit.

17. An application program as recited in claim 16, wherein the computer has a known number of processors, and wherein the variable limit is always as great as the known number of processors.

18. An application program as recited in claim 16, wherein the gating function is configured to delay execution of its execution thread for no more than a predefined time.

19. An application program as recited in claim 16, wherein the gating function repeatedly compares the current count of active execution threads to the variable limit to determine whether to continue to delay execution of its execution thread.

20. An application program as recited in claim 16, wherein:
- the gating function repeatedly compares the current count of active execution threads to the variable limit to determine whether to continue to delay execution of its execution thread;
- the gating function is configured to delay its execution thread for no more than a predefined cumulative time.

21. An application program as recited in claim 16, wherein:
- the gating function increments the current count of active execution threads;
- the exit function decrements the current count of active execution threads.

22. An application program as recited in claim 16, wherein the gating function changes the variable limit only after predefined intervals.

23. An application program as recited in claim 16, wherein the gating function changes the variable limit by increasing amounts after predefined intervals.

24. An application program as recited in claim 16, wherein the gating function lowers the variable limit if current processor load is over a first threshold; and wherein the gating function raises the variable limit if the current processor load is under a second threshold.

25. A computer comprising:
   a plurality of processors having time-varying processor loads;
   an application program that is executed by the plurality of processors;
   wherein the application program performs steps comprising:
      assigning task requests to a plurality of available execution threads;
      activating no more execution threads than an allowed number limit of the available execution threads;
      repeatedly changing the allowed number limit during execution of the application program depending on the current processor load of the computer, thereby allowing activation of more or fewer execution threads.

26. A computer as recited in claim 25, wherein the computer has a known number of processors, and wherein the allowed number limit is always as great as the known number of processors.

27. A computer as recited in claim 25, wherein the step of repeatedly changing the allowed number limit is performed only at predefined minimum intervals.

28. A computer as recited in claim 25, wherein the step of repeatedly changing the allowed number limit comprises:
   lowering the allowed number limit if the current processor load is over a first threshold;
   raising the allowed number limit if the current processor load is under a second threshold.

29. A computer as recited in claim 25, wherein the step of repeatedly changing the allowed number limit is performed by a gating function that is called from within the execution threads upon initiation of the execution threads.

30. A computer as recited in claim 25, wherein the step of repeatedly changing the allowed number limit is performed by a gating function that is called from within the execution threads upon initiation of the execution threads, wherein the gating function limits the number of active execution threads by delaying its own execution thread.

31. An electronically-accessible medium storing instructions for a computer, the instructions capable of configuring the computer to effectuate actions comprising:
   providing access to a plurality of available execution threads of the computer;
   maintaining a variable limit on the number of active execution threads;
   assigning task requests to execution threads of the plurality of available execution threads;
   within a given execution thread:
      calling a gating function before performing a task request assigned to the given execution thread;
      comparing the variable limit to the number of active execution threads; and
      delaying performance of the task request depending on a result of the comparing action; and
   changing the variable limit responsive to a current processor load of the computer.

32. An electronically-accessible medium as recited in claim 31, wherein the changing action comprises the actions of:
   increasing the variable limit if the current processor load is below a first threshold; and
   decreasing the variable limit if the current processor load is above a second threshold.

33. An electronically-accessible medium as recited in claim 31, wherein the changing action is performed by at least one of the gating function and another function called by the gating function.

34. An electronically-accessible medium as recited in claim 31, further comprising:
   incrementing, by the gating function, a current count of the number of active execution threads when performance of the task request is not being delayed by the action of delaying; and
   decrementing, by an exit function, the current count of the number of active execution threads after the task request is completed by the given execution thread.

35. An electronically-accessible medium as recited in claim 31, wherein the delaying action comprises the action of:
   delaying performance of the task request if the number of active execution threads is equal to or greater than the variable limit.

36. An application program that configures a computer to perform actions comprising:
   maintaining a current count of active execution threads of a plurality of available execution threads by performing actions comprising:
      incrementing the current count of active execution threads when a given execution thread of the plurality of available execution threads becomes active; and
      decrementing the current count of active execution threads when the given execution thread of the plurality of available execution threads ceases to be active;
   receiving a task request;
   assigning the task request to a respective execution thread of the plurality of available execution threads;
   comparing the current count of active execution threads to a number of active execution threads limit; and
   permitting the respective execution thread to begin handling the task request and thereby become active responsive to the comparing action;
   wherein the number of active execution threads limit is adjusted based on a current processor utilization of the computer.

37. An application program as recited in claim 36, wherein the permitting action comprises the action of:
   permitting the respective execution thread to begin handling the task request and thereby become active if the current count of active execution threads is less than the number of active execution threads limit.

38. An arrangement for managing execution threads on a computer having varying processor loads, comprising:
   means for assigning task requests to a plurality of available execution threads;
   means for activating no more execution threads than an allowed number limit of the available execution threads; and
   means for repeatedly changing the allowed number limit during execution of the execution threads depending on the current processor load of the computer.

39. A method of thread optimization for a computer, comprising:

comparing a current number of active execution threads with a number of active execution threads limit;

delaying activation of a given execution thread having an assigned task request if a favorable comparison result is not realized;

ascertaining a current processor utilization value;

determining whether the current processor utilization value is at least one of less than and equal to a lower threshold;

if so, increasing the number of active execution threads limit;

determining whether the current processor utilization value is at least one of greater than and equal to an upper threshold;

if so, decreasing the number of active execution threads limit.

40. A method as recited in claim 39, wherein the current processor utilization value comprises a percentage of full utilization of a plurality of processors of the computer.

41. A method as recited in claim 39, wherein the ascertaining action comprises the action of:

calling a processor utilization function to receive the current processor utilization value or a basis thereof from the processor utilization function.

42. A method as recited in claim 39, wherein the favorable comparison result comprises a condition in which the current number of active execution threads is lower than the number of active execution threads limit.

* * * * *